US012662250B2

(12) United States Patent
Breault et al.

(10) Patent No.: US 12,662,250 B2
(45) Date of Patent: Jun. 23, 2026

(54) AIRCRAFT WITH SYMMETRIC PROPULSION SYSTEM ROTATING PATTERNS

(71) Applicant: RTX Corporation, Farmington, CT (US)

(72) Inventors: Andrew E. Breault, Bolton, CT (US); Jeffrey T. Morton, Manchester, CT (US); Jon E. Sobanski, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 2 days.

(21) Appl. No.: 18/969,966

(22) Filed: Dec. 5, 2024

(65) Prior Publication Data

US 2026/0159242 A1     Jun. 11, 2026

(51) Int. Cl.
*B64D 27/12*     (2006.01)
*B64D 27/00*     (2006.01)

(52) U.S. Cl.
CPC ........ *B64D 27/12* (2013.01); *B64D 2027/005* (2013.01)

(58) Field of Classification Search
CPC ...... B64D 2033/0293; B64D 2027/005; B64D 27/12; B64D 27/02
See application file for complete search history.

(56) References Cited

U.S. PATENT DOCUMENTS

| | | | |
|---|---|---|---|
| 3,194,516 A | * | 7/1965 | Messerschmitt ....... B64D 27/20 |
| | | | 244/74 |
| 8,402,740 B2 | | 3/2013 | Guemmer |
| 8,701,381 B2 | | 4/2014 | Eames |
| 10,473,035 B2 | | 11/2019 | Brault |
| 11,111,790 B2 | | 9/2021 | Cooper |
| 2011/0268563 A1* | | 11/2011 | Stretton .................. F02K 3/072 |
| | | | 415/179 |
| 2012/0023898 A1* | | 2/2012 | Mackie ..................... F01D 1/26 |
| | | | 60/39.162 |
| 2023/0219681 A1* | | 7/2023 | Turner .................... B64C 21/08 |
| | | | 415/115 |
| 2024/0017841 A1 | | 1/2024 | Freer |
| 2024/0017842 A1 | | 1/2024 | Freer |

* cited by examiner

*Primary Examiner* — Rodolphe Andre Chabreyrie
(74) *Attorney, Agent, or Firm* — Getz Balich LLC

(57)     ABSTRACT
A first core turbine rotor of a first propulsion system is disposed in a first core turbine section and is configured to rotate in a first rotational direction. A first power turbine rotor is disposed in a first power turbine section and is configured to rotate in the first rotational direction. The first power turbine rotor is operatively coupled to a first open propulsor rotor. A second core turbine rotor of a second propulsion system is disposed in a second core turbine section and is configured to rotate in the first rotational direction. A second power turbine rotor is disposed in a second power turbine section and is configured to rotate in a second rotational direction that is opposite the first rotational direction. The second power turbine rotor is operatively coupled to a second open propulsor rotor.

19 Claims, 10 Drawing Sheets

AIRCRAFT WITH SYMMETRIC PROPULSION SYSTEM ROTATING PATTERNS

BACKGROUND OF THE DISCLOSURE

1. Technical Field

This disclosure relates generally to an aircraft and, more particularly, to propulsion system(s) for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, an aircraft system includes a first propulsion system and a second propulsion system. The first propulsion system includes a first open propulsor rotor, a first core compressor section, a first core combustor section, a first core turbine section, a first power turbine section, a first flowpath, a first core turbine rotor and a first power turbine rotor. The first flowpath extends through the first core compressor section, the first core combustor section, the first core turbine section and the first power turbine section from an inlet into the first flowpath to an exhaust from the first flowpath. The first core turbine rotor is disposed in the first core turbine section and is configured to rotate in a first rotational direction. The first power turbine rotor is disposed in the first power turbine section and is configured to rotate in the first rotational direction. The first power turbine rotor is operatively coupled to the first open propulsor rotor. The second propulsion system includes a second open propulsor rotor, a second core compressor section, a second core combustor section, a second core turbine section, a second power turbine section, a second flowpath, a second core turbine rotor and a second power turbine rotor. The second flowpath extends through the second core compressor section, the second core combustor section, the second core turbine section and the second power turbine section from an inlet into the second flowpath to an exhaust from the second flowpath. The second core turbine rotor is disposed in the second core turbine section and is configured to rotate in the first rotational direction. The second power turbine rotor is disposed in the second power turbine section and is configured to rotate in a second rotational direction that is opposite the first rotational direction. The second power turbine rotor is operatively coupled to the second open propulsor rotor.

According to another aspect of the present disclosure, another aircraft system includes a first open propulsor rotor, a first open guide vane structure and a first turbine engine. The first open guide vane structure is next to the first open propulsor rotor. The first turbine engine includes a first core compressor section, a first core combustor section, a first core turbine section, a first power turbine section, a first flowpath, a first core turbine rotor and a first power turbine rotor. The first flowpath extends through the first core compressor section, the first core combustor section, the first core turbine section and the first power turbine section from an inlet into the first flowpath to an exhaust from the first flowpath. The first core turbine rotor is disposed in the first core turbine section and is configured to rotate in a first rotational direction. The first power turbine rotor is disposed in the first power turbine section and is configured to rotate in the first rotational direction. The first power turbine rotor is also configured to drive rotation of the first open propulsor rotor in a first direction of rotation about a first axis. The first direction of rotation may be the first rotational direction or a second rotational direction that is opposite the first rotational direction. The first power turbine rotor is disposed axially between the first open propulsor rotor and the first core turbine rotor along the first axis.

According to still another aspect of the present disclosure, another aircraft system includes a first open propulsor rotor, a first open guide vane structure and a first turbine engine. The first open guide vane structure is next to the first open propulsor rotor. The first turbine engine includes a first core compressor section, a first core combustor section, a first core turbine section, a first power turbine section, a first flowpath, a first core turbine rotor and a first power turbine rotor. The first flowpath extends through the first core compressor section, the first core combustor section, the first core turbine section and the first power turbine section from an inlet into the first flowpath to an exhaust from the first flowpath. The first core turbine rotor is disposed in the first core turbine section and is configured to rotate in a first rotational direction. The first power turbine rotor is disposed in the first power turbine section and is configured to rotate in a second rotational direction that is opposite the first rotational direction. The first power turbine rotor is also configured to drive rotation of the first open propulsor rotor in the first rotational direction or the second rotational direction about a first axis. The first power turbine rotor is disposed axially between the first open propulsor rotor and the first core turbine rotor along the first axis.

The aircraft system may also include a second open propulsor rotor, a second open guide vane structure and a second turbine engine. The second open guide vane structure may be next to the second open propulsor rotor. The second turbine engine may include a second core compressor section, a second core combustor section, a second core turbine section, a second power turbine section, a second flowpath, a second core turbine rotor and a second power turbine rotor. The second flowpath may extend through the second core compressor section, the second core combustor section, the second core turbine section and the second power turbine section from an inlet into the second flowpath to an exhaust from the second flowpath. The second core turbine rotor may be disposed in the second core turbine section and may be configured to rotate in the first rotational direction. The second power turbine rotor may be disposed in the second power turbine section and may be configured to rotate in the second rotational direction. The second power turbine rotor may also be configured to drive rotation of the second open propulsor rotor in a second direction of rotation about a second axis that is opposite the first direction of rotation. The second power turbine rotor may be disposed axially between the second open propulsor rotor and the second core turbine rotor along the second axis.

The first core turbine rotor may be a first intermediate pressure turbine rotor. The first turbine engine may also include a first high pressure turbine rotor also disposed in the first core turbine section. The first intermediate pressure turbine rotor may be disposed between the first high pressure turbine rotor and the first power turbine rotor along the first flowpath.

The first open propulsor rotor may be configured to rotate in an opposite rotational direction than the second open propulsor rotor.

The first open propulsor rotor may be configured to rotate in the first rotational direction. The second open propulsor may be configured to rotate in the second rotational direction.

The first open propulsor rotor may be configured to rotate in the second rotational direction. The second open propulsor may be configured to rotate in the first rotational direction.

The first propulsion system may also include a first module and a first engine core. The first module may include the first open propulsor rotor and a first open guide vane structure axially next to the first open propulsor rotor. The first engine core may include the first core compressor section, the first core combustor section and the first core turbine section. The first module may be configured to be installed with or removed from the first engine core as a complete unit. In addition or alternatively, the second propulsion system may also include a second module and a second engine core. The second module may include the second open propulsor rotor and a second open guide vane structure axially next to the second open propulsor rotor. The second engine core may include the second core compressor section, the second core combustor section and the second core turbine section. The second module may be configured to be installed with or removed from the second engine core as a complete unit.

The first propulsion system may also include a first module and a first engine core. The first module may include the first open propulsor rotor and the first power turbine section. The first engine core may include the first core compressor section, the first core combustor section and the first core turbine section. The first module may be configured to be installed with or removed from the first engine core as a complete unit. In addition or alternatively, the second propulsion system may also include a second module and a second engine core. The second module may include the second open propulsor rotor and the second power turbine section. The second engine core may include the second core compressor section, the second core combustor section and the second core turbine section. The second module may be configured to be installed with or removed from the second engine core as a complete unit.

The first propulsion system may also include a first module and a first engine core. The first module may include the first power turbine section. The first engine core may include the first core compressor section, the first core combustor section and the first core turbine section. The first module may be configured to be installed with or removed from the first engine core as a complete unit. In addition or alternatively, the second propulsion system may also include a second module and a second engine core. The second module may include the second power turbine section. The second engine core may include the second core compressor section, the second core combustor section and the second core turbine section. The second module may be configured to be installed with or removed from the second engine core as a complete unit.

The first core turbine rotor may be a first intermediate pressure turbine rotor. The first propulsion system may also include a first high pressure turbine rotor also disposed in the first core turbine section. The first intermediate pressure turbine rotor may be disposed between the first high pressure turbine rotor and the first power turbine rotor along the first flowpath. In addition or alternatively, the second core turbine rotor may be a second intermediate pressure turbine rotor. The second propulsion system may also include a second high pressure turbine rotor also disposed in the second core turbine section. The second intermediate pressure turbine rotor may be disposed between the second high pressure turbine rotor and the second power turbine rotor along the second flowpath.

The first open propulsor rotor may be rotatable about a first axis. The first power turbine rotor may be located axially between the first open propulsor rotor and the first core turbine rotor along the first axis. In addition or alternatively, the second open propulsor rotor may be rotatable about a second axis. The second power turbine rotor may be located axially between the second open propulsor rotor and the second core turbine rotor along the second axis.

The first open propulsor rotor may be rotatable about a first axis. The first core turbine rotor may be located axially between the first open propulsor rotor and the first power turbine rotor along the first axis. In addition or alternatively, the second open propulsor rotor may be rotatable about a second axis. The second core turbine rotor may be located axially between the second open propulsor rotor and the second power turbine rotor along the second axis.

The first open propulsor rotor may be coaxial with the first power turbine rotor. In addition or alternatively, the second open propulsor rotor may be coaxial with the second power turbine rotor.

The first open propulsor rotor may be coaxial with the first core turbine rotor. In addition or alternatively, the second open propulsor rotor may be coaxial with the second core turbine rotor.

The first open propulsor rotor may be rotatable about a first propulsor axis. The first core turbine rotor may be rotatable about a first core axis that is angularly offset from the first propulsor axis. In addition or alternatively, the second open propulsor rotor may be rotatable about a second propulsor axis. The second core turbine rotor may be rotatable about a second core axis that is angularly offset from the second propulsor axis.

The first open propulsor rotor may be rotatable about a first propulsor axis. The first core turbine rotor may be rotatable about a first core axis that is laterally offset from the first propulsor axis. In addition or alternatively, the second open propulsor rotor may be rotatable about a second propulsor axis. The second core turbine rotor may be rotatable about a second core axis that is laterally offset from the second propulsor axis.

The first propulsion system may also include a first open guide vane structure axially next to and downstream of the first open propulsor rotor. In addition or alternatively, the second propulsion system may also include a second open guide vane structure axially next to and downstream of the second open propulsor rotor.

The first propulsion system may also include a first geartrain operatively coupling the first power turbine rotor to the first open propulsor rotor. In addition or alternatively, the second propulsion system may also include a second geartrain operatively coupling the second power turbine rotor to the second open propulsor rotor.

The aircraft system may also include an aircraft fuselage arranged laterally between the first propulsion system and the second propulsion system.

The first propulsion system may also include a first open guide vane structure axially next to the first open propulsor rotor. In addition or alternatively, the second propulsion system may also include a second open guide vane structure axially next to the second open propulsor rotor.

The first propulsion system may also include a first open guide vane structure downstream of the first open propulsor rotor. In addition or alternatively, the second propulsion system may also include a second open guide vane structure downstream of the second open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
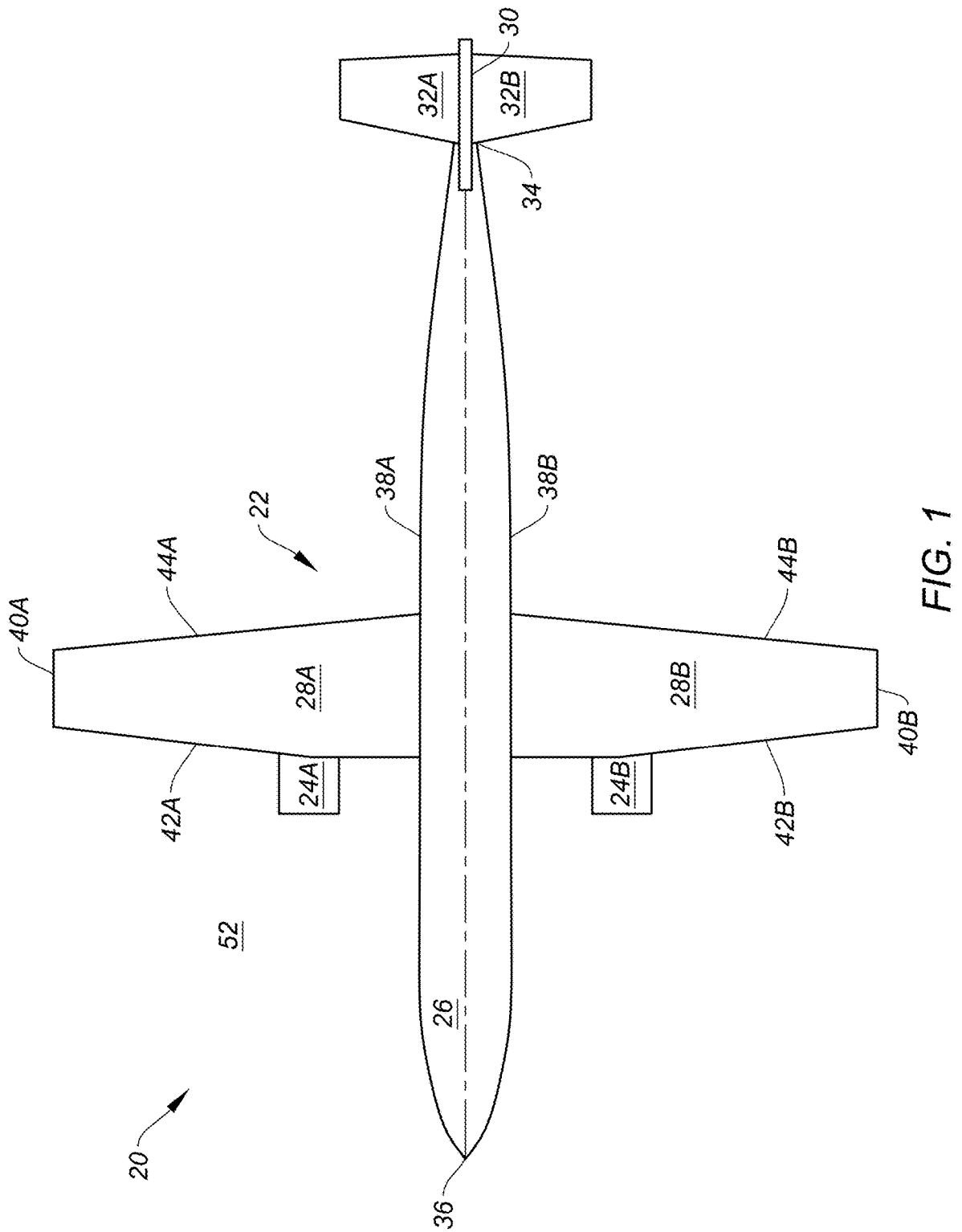
FIG. 1 is a schematic illustration of an aircraft with multiple propulsion systems mounted to wings of the aircraft.

FIG. 1 is a schematic illustration of an aircraft 20. This aircraft 20 may be an airplane, a drone (e.g., an unmanned aerial vehicle (UAV)), or any other manned or unmanned aerial vehicle or system. The aircraft 20 includes an aircraft airframe 22 and one or more aircraft propulsion systems 24A and 24B (generally referred to as "24"); e.g., a pair of companion aircraft propulsion systems.

The aircraft airframe 22 of FIG. 1 includes an aircraft fuselage 26 and one or more aircraft wings 28A and 28B (generally referred to as "28"). This aircraft airframe 22 may also include one or more aircraft stabilizers, such as at least one vertical stabilizer 30 and one or more horizontal stabilizers 32A and 32B (generally referred to as "32") arranged at (e.g., on, adjacent or proximate) an aft, downstream tail end 34 of the aircraft fuselage 26. However, in other embodiments, it is contemplated one or more of the aircraft stabilizers 30, 32A and/or 32B may be omitted where, for example, the aircraft 20 is alternatively configured as a blended wing aircraft.

The aircraft fuselage 26 extends longitudinally along a longitudinal centerline of the aircraft airframe 22 and its aircraft fuselage 26 from a forward, upstream nose end 36 of the aircraft airframe 22 and its aircraft fuselage 26 to the fuselage tail end 34. The aircraft fuselage 26 extends laterally between and to opposing lateral sides 38A and 38B (generally referred to as "38") of the aircraft fuselage 26.

The aircraft wings 28A and 28B are arranged to the opposing lateral sides 38A and 38B of the aircraft fuselage 26. The first aircraft wing 28A of FIG. 1, for example, is connected to the aircraft fuselage 26 at the fuselage first side 38A. The second aircraft wing 28B is connected to the aircraft fuselage 26 at the fuselage second side 38B. The aircraft fuselage 26 of FIG. 1 is thereby located laterally between the first aircraft wing 28A and the second aircraft wing 28B. Each of these aircraft wings 28A and 28B projects spanwise out from the aircraft fuselage 26 to a tip 40A, 40B of the respective aircraft wing 28A, 28B. Each of the aircraft wings 28A and 28B extends longitudinally between and to a leading edge 42A, 42B of the respective aircraft wing 28A, 28B and a trailing edge 44A, 44B of the respective aircraft wing 28A, 28B.

Figure 2:
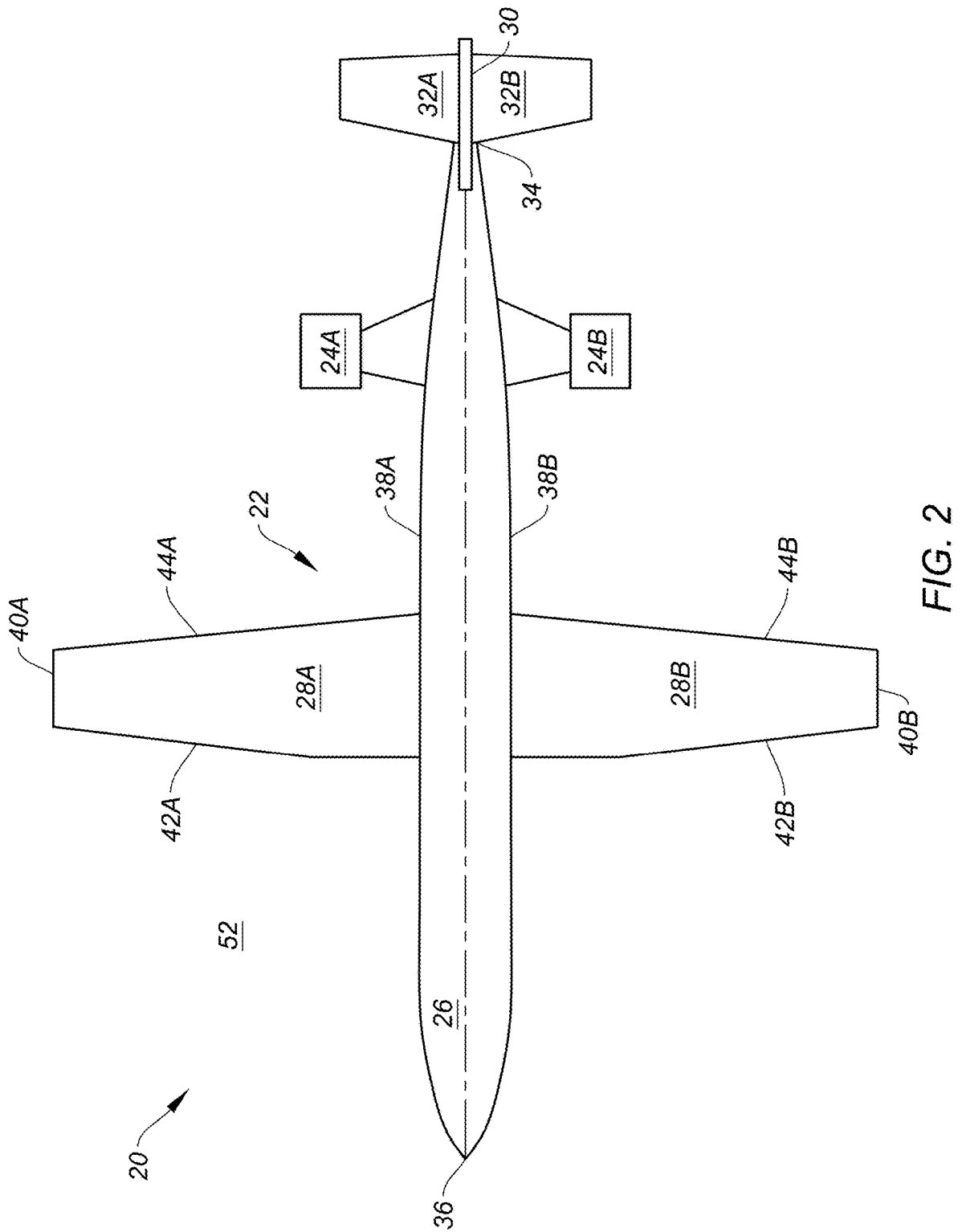
FIG. 2 is a schematic illustration of the aircraft with its propulsion systems mounted to a fuselage of the aircraft.

The aircraft propulsion systems 24A and 24B of FIG. 1 are arranged to the opposing lateral sides 38A and 38B of the aircraft fuselage 26. The first aircraft propulsion system 24A of FIG. 1, for example, is mounted to the first aircraft wing 28A. The second aircraft propulsion system 24B is mounted to the second aircraft wing 28B. The aircraft fuselage 26 of FIG. 1 is thereby located laterally between the first aircraft propulsion system 24A and the second aircraft propulsion system 24B. The present disclosure, however, is not limited to such an exemplary arrangement. For example, referring to FIG. 2, the first aircraft propulsion system 24A may alternatively be mounted to the aircraft fuselage 26 at the fuselage first side 38A. The second aircraft propulsion system 24B may alternatively be mounted to the aircraft fuselage 26 at the fuselage second side 38B.

Figure 3:
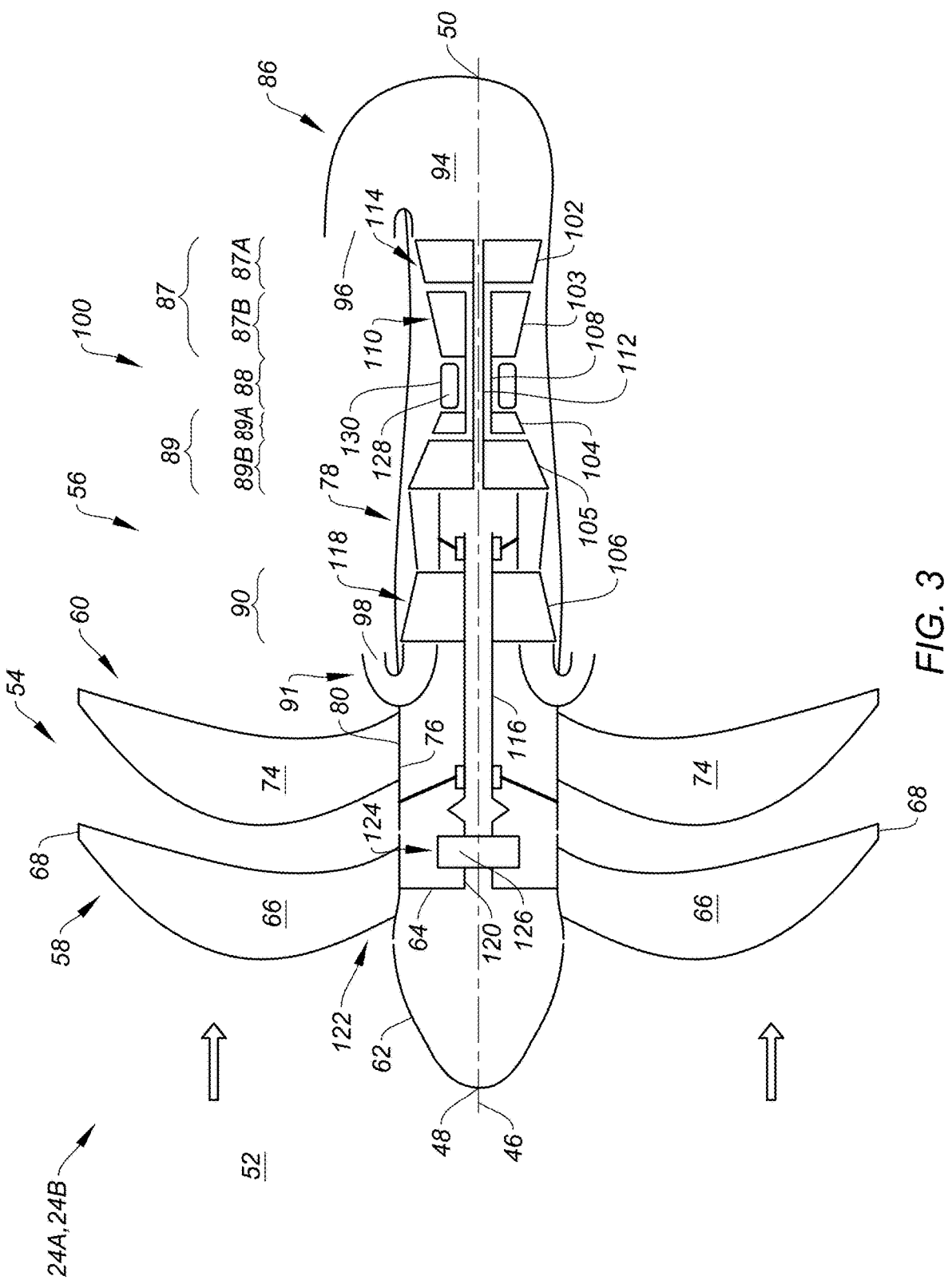
FIG. 3 is a schematic illustration of an exemplary one of the propulsion systems.

Referring to FIG. 3, each aircraft propulsion system 24 extends axially along an axis 46 between an upstream, forward end 48 of the aircraft propulsion system 24 and a downstream, aft end 50 of the aircraft propulsion system 24. The propulsion system axis 46 may be a centerline axis of the respective aircraft propulsion system 24 and/or a centerline axis of one or more members of the respective aircraft propulsion system 24. The propulsion system axis 46 may also or alternatively be a rotational axis of one or more members of the respective aircraft propulsion system 24.

Each aircraft propulsion system 24 may be configured as an open rotor propulsion system with a single open rotor and swirl recovery vane (SRV) architecture. Herein, the term "open" may describe a propulsion system section and/or a propulsion system component which is open to an environment 52 (e.g., an ambient environment) external to the aircraft propulsion system 24 and, more generally, the aircraft 20. The aircraft propulsion system 24 of FIG. 3, for example, includes an open rotor propulsion section 54 and a gas turbine engine 56.

The propulsion section 54 of FIG. 3 includes an open propulsor rotor 58 and an open guide vane structure 60. These propulsion section members 58 and 60 are un-ducted and unshrouded components of the aircraft propulsion system and its propulsion section 54. In an alternate embodiment, the open guide vane structure 60 may include a shrouded component. The propulsion section 54 of FIG. 3 also includes a nose cone 62 disposed at (e.g., on, adjacent or proximate) the propulsion system forward end 48. Briefly, this nose cone 62 may be configured as a spinner which is rotatable with the propulsor rotor 58 about the propulsion system axis 46. Alternatively, the nose cone 62 may be configured as a stationary structure of the propulsion section 54.

The propulsor rotor 58 includes a rotor base 64 (e.g., a disk or a hub) and a plurality of open propulsor blades 66 (e.g., airfoils). The propulsor blades 66 are arranged and may be equispaced circumferentially about the rotor base 64 and the propulsion system axis 46 in an array; e.g., a circular array. Each of the propulsor blades 66 is connected to (e.g., formed integral with or otherwise attached to) the rotor base 64. Each of the propulsor blades 66 projects spanwise along a span line of the respective propulsor blade 66 (e.g., radially relative to the propulsion system axis 46) out from an exterior surface of the rotor base 64, into the external environment 52, to an unshrouded distal tip 68 of the respective propulsor blade 66. Each propulsor blade 66 is thereby configured as an un-ducted and unshrouded propulsor blade 66 which is exposed to (e.g., disposed in) the surrounding external environment 52.

Figure 4:
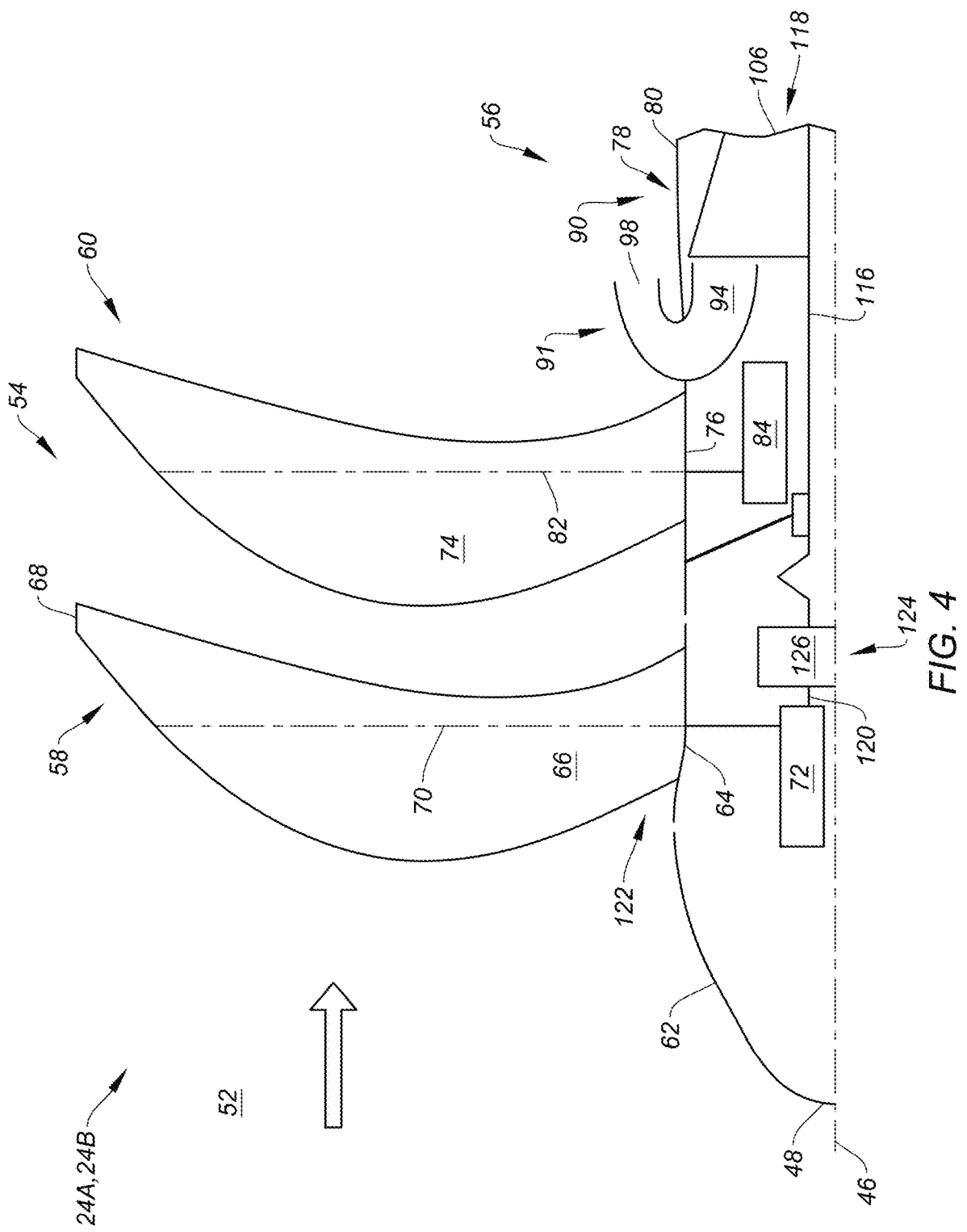
FIG. 4 is a schematic illustration of a forward portion of the propulsion system of FIG. 3.

Referring to FIG. 4, each propulsor blade 66 may be configured to pivot about a respective blade pivot axis 70. This blade pivot axis 70 extends radially relative to the propulsion system axis 46. The blade pivot axis 70 of FIG. 4, for example, is arranged perpendicular to the propulsion system axis 46 when viewed, for example, in a longitudinal reference plane parallel to (e.g., including) the propulsion system axis 46; e.g., the plane of FIG. 4. Each propulsor blade 66 of FIG. 4 is operatively coupled with a blade actuation system 72. This blade actuation system 72 is configured to pivot each propulsor blade 66 about its own respective blade pivot axis 70. By pivoting each propulsor blade 66 about its blade pivot axis 70, a pitch of the respective propulsor blade 66 may be changed. Note, while the blade pivot axis 70 is shown in FIG. 4 as being perpendicular to the propulsion system axis 46, it is contemplated this blade pivot axis 70 may or may not be coincident with the propulsion system axis 46. Moreover, it is contemplated each blade pivot axis 70 may alternatively be angularly offset from the propulsion system axis 46 by an acute angle or an obtuse angle when viewed, for example, in the longitudinal reference plane. Of course, it is contemplated some or all of the propulsor blades 66 may be alternatively moved to change the propulsor blade pitch. Moreover, it is contemplated some or all of the propulsor blades 66 may alternatively be fixed pitch propulsor blades in other embodiments.

The guide vane structure 60 of FIG. 3 includes a plurality of open exit guide vanes 74 (e.g., airfoils) that are arranged and may be equispaced circumferentially about the propulsion system axis 46 in an array; e.g., a circular array. This guide vane structure 60 and its guide vanes 74 are arranged axially next to (e.g., adjacent) the propulsor rotor 58 and its propulsor blades 66. The guide vane structure 60 and its guide vanes 74 of FIG. 3, for example, are arranged downstream of the propulsor rotor 58 and its propulsor blades 66, without (e.g., any) other elements axially therebetween to obstruct, turn and/or otherwise influence the air propelled by the propulsor rotor 58 to the guide vane structure 60 for example. Each of the guide vanes 74 of FIG. 3 is coupled to a support structure 76 of a stationary housing structure 78 for the aircraft propulsion system 24. This support structure 76 may be configured as or otherwise include a support frame, a case and/or another fixed structure of the housing structure 78. Each of the guide vanes 74 projects spanwise along a span line of the respective guide vane 74 (e.g., radially relative to the propulsion system axis 46) out from an exterior surface 80 of the housing structure 78, into the external environment 52, to a distal tip of the respective guide vane 74, which may be unshrouded (as illustrated in FIG. 3) or shrouded. Here, the exterior surface 80 radially borders the external environment 52 and forms an exterior aerodynamic flow surface of the aircraft propulsion system 24. Each guide vane 74 is thereby configured as an un-ducted guide vane 74 which is exposed to (e.g., disposed in) the surrounding external environment 52.

Referring to FIG. 4, each guide vane 74 may be configured to pivot about a respective vane pivot axis 82. This vane pivot axis 82 extends radially relative to the propulsion system axis 46. The vane pivot axis 82 of FIG. 4, for example, is arranged perpendicular to the propulsion system axis 46 when viewed, for example, in the longitudinal reference plane. Each guide vane 74 of FIG. 4 is operatively coupled with a vane actuation system 84, which vane actuation system 84 may be discrete from or integrated as part of the blade actuation system 72. The vane actuation system 84 is configured to pivot each guide vane 74 about its own respective vane pivot axis 82. By pivoting each guide vane 74 about its vane pivot axis 82, a pitch of the respective guide vane 74 may be changed. Note, while the vane pivot axis 82 is shown in FIG. 4 as being perpendicular to the propulsion system axis 46, it is contemplated this vane pivot axis 82 may or may not be coincident with the propulsion system axis 46. Moreover, it is contemplated each vane pivot axis 82 may alternatively be angularly offset from the propulsion system axis 46 by an acute angle or an obtuse angle when viewed, for example, in the longitudinal reference plane. Of course, it is contemplated some or all of the guide vanes 74 may be alternatively moved to change the guide vane pitch. Moreover, it is contemplated some or all of the guide vanes 74 may alternatively be fixed pitch guide vanes in other embodiments.

Referring to FIG. 3, the turbine engine 56 includes an inlet section 86, a core compressor section 87, a core combustor section 88, a core turbine section 89, a power turbine (PT) section 90 and an exhaust section 91. The core compressor section 87 of FIG. 3 includes a low pressure compressor (LPC) section 87A and a high pressure compressor (HPC) section 87B. The core turbine section 89 of FIG. 3 includes a high pressure turbine (HPT) section 89A and an intermediate pressure turbine (IPT) section 89B, where the PT section 90 is a low pressure turbine (LPT) section of the turbine engine 56. The turbine engine 56 also includes an (e.g., annular) engine flowpath 94 which extends longitudinally through the aircraft propulsion system 24 of FIG. 3 and its turbine engine 56 from an airflow inlet 96 into the engine flowpath 94 to a combustion products exhaust 98 from the engine flowpath 94. The flowpath inlet 96 is also an airflow inlet into the aircraft propulsion system 24 of FIG. 3 and its turbine engine 56. The flowpath exhaust 98 is also a combustion products exhaust from the aircraft propulsion system 24 of FIG. 3 and its turbine engine 56. At least (or only) the LPC section 87A, the HPC section 87B, the combustor section 88, the HPT section 89A and the IPT section 89B collectively form a core 100 (e.g., a gas generator) of the turbine engine 56.

Each of the engine sections 87A, 87B, 89A, 89B and 90 includes a respective bladed rotor 102-106; e.g., a ducted and/or shrouded engine rotor. Each of these engine rotors 102-106 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 94. Each of the rotor blades is connected to the respective rotor base. Each of the rotor blades projects radially (e.g., spanwise) out from the respective rotor base into the engine flowpath 94 and to a distal tip of the respective rotor blade.

The HPC rotor 103 is coupled to and rotatable with the HPT rotor 104. The HPC rotor 103 of FIG. 3, for example, is connected to the HPT rotor 104 by a high speed shaft 108. At least (or only) the HPC rotor 103, the HPT rotor 104 and the high speed shaft 108 collectively form a high speed rotating structure 110; e.g., a high speed spool of the engine core 100. This high speed rotating structure 110 of FIG. 3 and its members 103, 104 and 108 are rotatable about the propulsion system axis 46.

The LPC rotor 102 is coupled to and rotatable with the IPT rotor 105. The LPC rotor 102 of FIG. 3, for example, is connected to the IPT rotor 105 by a low speed shaft 112. At least (or only) the LPC rotor 102, the IPT rotor 105 and the low speed shaft 112 collectively form a low speed rotating structure 114; e.g., a low speed spool of the engine core 100. This low speed rotating structure 114 of FIG. 3 and its members 102, 105 and 112 are rotatable about the propulsion system axis 46.

The PT rotor 106 (e.g., the LPT rotor) is connected to and rotatable with a power turbine shaft 116. At least (or only) the PT rotor 106 and the power turbine shaft 116 collectively form a power turbine rotating structure 118. This power turbine rotating structure 118 of FIG. 3 and its members 106 and 116 are rotatable about the propulsion system axis 46.

The propulsor rotor 58 is connected to and rotatable with a propulsor shaft 120. At least (or only) the propulsor rotor 58 and the propulsor shaft 120 collectively form a propulsor rotating structure 122. This propulsor rotating structure 122 of FIG. 3 and its members 58 and 120 are rotatable about the propulsion system axis 46.

The power turbine rotating structure 118 is coupled to the propulsor rotating structure 122 through a drivetrain 124. This drivetrain 124 may be configured as a geared drivetrain, where a geartrain 126 (e.g., a transmission, a speed change device, an epicyclic geartrain, etc.) is disposed between and operatively couples the propulsor rotating structure 122 and its propulsor rotor 58 to the power turbine rotating structure 118 and its PT rotor 106. With this arrangement, the propulsor rotating structure 122 and its propulsor rotor 58 may rotate at a different (e.g., slower) rotational speed than the power turbine rotating structure 118 and its PT rotor 106. Here, the propulsor rotating structure 122 and the power turbine rotating structure 118 may rotate in a common (the same) rotational direction about the propulsion system axis 46 or in opposite directions about the propulsion system axis 46 depending, for example, upon the specific configuration of the geartrain 126. Alternatively, the drivetrain 124 may be configured as a direct-drive drivetrain, where the geartrain 126 is omitted. With such an arrangement, the propulsor rotating structure 122 and its propulsor rotor 58 rotate at a common (the same) rotational speed as the power turbine rotating structure 118 and its PT rotor 106.

The engine sections 86-91 may be housed within and/or formed by the housing structure 78. This housing structure 78 includes an engine case and a nacelle. The engine case houses one or more of the engine sections 87A-90; e.g., the engine core 100 and the PT section 90. The engine case, for example, may extend axially along (e.g., axially overlaps) and extend circumferentially about (e.g., circumscribes) the engine sections 87A-90 and their respective bladed rotors 102-106. The engine case may also house the geartrain 126. The nacelle houses and provides an aerodynamic cover over the engine case. An exterior wall of the nacelle, for example, may be disposed radially outboard of, extend axially along (e.g., axially overlaps) and extend circumferentially about (e.g., circumscribes) the engine core 100, the PT section 90 and the engine case. This nacelle wall may at least partially or completely form the exterior surface 80. With the foregoing arrangement, the bladed rotors 102-106 are disposed within the housing structure 78. By contrast, the propulsor rotor 58 and the guide vane structure 60 are disposed at least partially (or completely) outside of the housing structure 78.

The LPC section 87A, the HPC section 87B, the combustor section 88, the HPT section 89A, the IPT section 89B, the PT section 90 and the propulsion section 54 may be arranged sequentially along the propulsion system axis 46 between the propulsion system aft end 50 and the propulsion system forward end 48. The inlet section 86 of FIG. 3 is disposed at or near the propulsion system aft end 50. The exhaust section 91 of FIG. 3 is disposed near the propulsion system forward end 48, for example axially between (a) the PT section 90 and/or the engine core 100 and (b) propulsion section 54 and/or the propulsor rotor 58. With this reverse flow arrangement, the HPT section 89A, the IPT section 89B, the PT section 90 and the exhaust section 91 may be arranged axially along the propulsion system axis 46 between (a) one or more of the engine sections 86-88 and (b) the propulsor rotor 58. The HPT section 89A, the IPT section 89B and optionally the PT section 90 may be arranged axially along the propulsion system axis 46 between (a) the combustor section 88 and (b) the propulsion section 54 and its propulsion section members 58 and 120. The PT section 90 may be arranged axially along the propulsion system axis 46 between (a) the engine core 100 and (b) the propulsor rotor 58 and, more generally, the entire propulsion section 54. The engine core 100 and the PT section 90 may each be arranged axially along the propulsion system axis 46 between (a) the inlet section 86 and/or the propulsion system aft end 50 and (b) the propulsor rotor 58 and, more generally, the entire propulsion section 54.

During operation of the aircraft propulsion system 24 of FIG. 3, ambient air within the external environment 52 is propelled by the rotating propulsor rotor 58 in the downstream, aft direction towards the propulsion system aft end 50. A major portion (e.g., more than 50%) of this air bypasses the turbine engine 56 to provide forward thrust while a minor portion (e.g., less than 50%) of the air flows into the turbine engine 56. For example, an outer stream of the air propelled by the rotating propulsor rotor 58 flows axially across the guide vane structure 60 and outside of the housing structure 78 and its exterior surface 80; e.g., along an exterior of the nacelle. The guide vane structure 60 conditions (e.g., straightens out, de-swirls, etc.) the outer stream of air within the external environment 52 to enhance the forward thrust. By contrast, an inner stream of the air propelled by the rotating propulsor rotor 58 may also flow across the guide vane structure 60 and then enter the turbine engine 56 and its engine flowpath 94 through the flowpath inlet 96. The air entering the engine flowpath 94 through the flowpath inlet 96 may be referred to as "core air".

The core air is compressed by the LPC rotor 102 and the HPC rotor 103 and directed into a combustion chamber 128 (e.g., an annular combustion chamber) of a combustor 130 (e.g., an annular combustor) in the combustor section 88. Fuel is injected into the combustion chamber 128 by one or more fuel injectors and mixed with the compressed core air to provide a fuel-air mixture. This fuel-air mixture is ignited and combustion products thereof flow through and sequentially drive rotation of the HPT rotor 104, the IPT rotor 105 and the PT rotor 106. The rotation of the HPT rotor 104 and the IPT rotor 105 respectively drive rotation of the HPC rotor 103 and the LPC rotor 102 and, thus, compression of the core air. The rotation of the PT rotor 106 drives the rotation of the propulsor rotor 58 through the drivetrain 124. The turbine engine 56 and its power turbine rotating structure 118 thereby power operation of (e.g., drive rotation of) the propulsor rotor 58 during aircraft propulsion system operation.

The low speed rotating structure 114 of each aircraft propulsion system 24A, 24B may rotate in a first rotational direction (e.g., clockwise or counterclockwise) about the respective propulsion system axis 46. Herein, a rotational direction of a rotating body may be viewed in a vertical reference plane that is perpendicular to its rotational axis and in an axially aft facing direction. Similarly, the high speed rotating structure 110 of each aircraft propulsion system 24A, 24B may rotate in the first rotational direction about the respective propulsion system axis 46. With such an arrangement, the engine core 100 of each aircraft propulsion system 24A, 24B is configured with co-rotating rotating structures 110 and 114; e.g., co-rotating spools. Alternatively, the high speed rotating structure 110 of each aircraft propulsion system 24A, 24B may rotate in a second rotational direction (e.g., counterclockwise or clockwise) about the respective propulsion system axis 46, which second rotational direction is rotationally opposite the first rotational direction. With such an arrangement, the engine core 100 of each aircraft propulsion system 24A, 24B is configured with counter-rotating rotating structures 110 and 114; e.g., counter-rotating spools.

The power turbine rotating structure 118 and its PT rotor 106, the propulsor rotating structure 122 and its propulsor rotor 58 and the drivetrain 124 of the first aircraft propulsion system 24A may be collectively configured such that (a) the power turbine rotating structure 118 and its PT rotor 106 and (b) the propulsor rotating structure 122 and its propulsor rotor 58 are co-rotating members. For example, (a) the power turbine rotating structure 118 and its PT rotor 106 and (b) the propulsor rotating structure 122 and its propulsor rotor 58 may be configured to rotate in the first rotational direction about the respective propulsion system axis 46. Here, the various members 114, 118 and 122 of the first aircraft propulsion system 24A, and optionally its high speed rotating structure 110, may be co-rotating members. Alternatively, the power turbine rotating structure 118 and its PT rotor 106, the propulsor rotating structure 122 and its propulsor rotor 58 and the drivetrain 124 of the first aircraft propulsion system 24A may be collectively configured such that (a) the power turbine rotating structure 118 and its PT rotor 106 and (b) the propulsor rotating structure 122 and its propulsor rotor 58 are counter-rotating members. For example, the power turbine rotating structure 118 and its PT rotor 106 may be configured to rotate in the first rotational direction about the respective propulsion system axis 46, whereas the propulsor rotating structure 122 and its propulsor rotor 58 may be configured to rotate in the second rotational direction about the respective propulsion system axis 46. Here, the various members 114 and 118 of the first aircraft propulsion system 24A, and optionally its high speed rotating structure 110, may be co-rotating members.

The power turbine rotating structure 118 and its PT rotor 106, the propulsor rotating structure 122 and its propulsor rotor 58 and the drivetrain 124 of the second aircraft propulsion system 24B may be collectively configured such that (a) the power turbine rotating structure 118 and its PT rotor 106 and (b) the propulsor rotating structure 122 and its propulsor rotor 58 are co-rotating members. For example, (a) the power turbine rotating structure 118 and its PT rotor 106 and (b) the propulsor rotating structure 122 and its propulsor rotor 58 may be configured to rotate in the second rotational direction about the respective propulsion system axis 46. Here, the various members 118 and 122 of the second aircraft propulsion system 24B counter-rotate relative to its core member 114, and optionally the high speed rotating structure 110. Alternatively, the power turbine rotating structure 118 and its PT rotor 106, the propulsor rotating structure 122 and its propulsor rotor 58 and the drivetrain 124 of the second aircraft propulsion system 24B may be collectively configured such that (a) the power turbine rotating structure 118 and its PT rotor 106 and (b) the propulsor rotating structure 122 and its propulsor rotor 58 are counter-rotating members. For example, the power turbine rotating structure 118 and its PT rotor 106 may be configured to rotate in the second rotational direction about the respective propulsion system axis 46, whereas the propulsor rotating structure 122 and its propulsor rotor 58 may be configured to rotate in the first rotational direction about the respective propulsion system axis 46. Here, the member 118 of the second aircraft propulsion system 24B counter-rotates relative to its core member 114, and optionally the high speed rotating structure 110.

Figures 5A, 5B, 6:
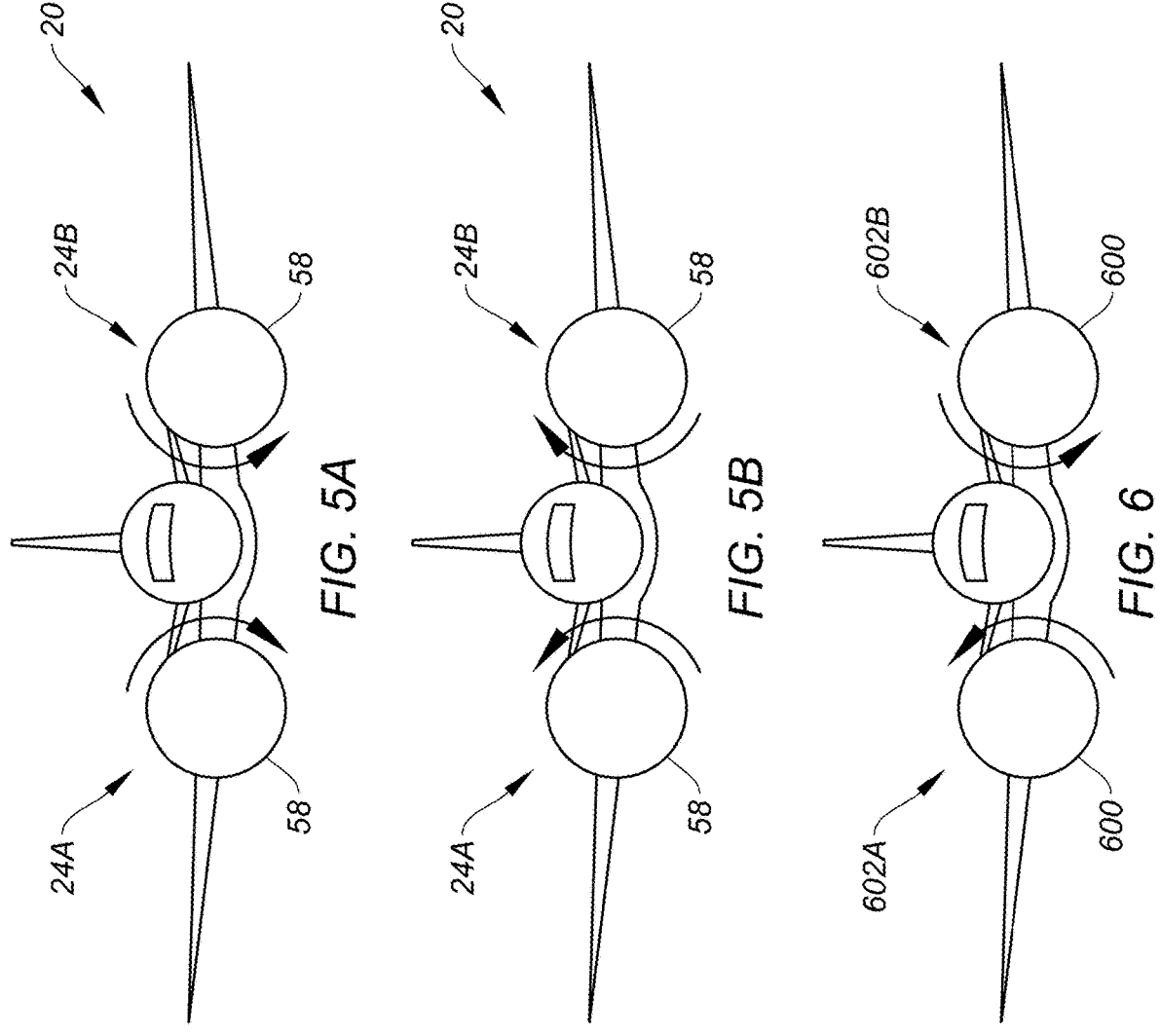
FIGS. 5A and 5B are front view illustrations of the aircraft depicting various symmetric propulsor rotating patterns.
FIG. 6 is a front view illustration of an aircraft depicting an asymmetric propulsor rotating pattern.

With the foregoing configurations, referring to FIGS. 5A and 5B, the propulsor rotor 58 of the first aircraft propulsion system 24A and the propulsor rotor 58 of the second aircraft propulsion system 24B rotate in different rotational directions during aircraft flight. In FIG. 5A, the propulsor rotors 58 of the aircraft propulsion systems 24A and 24B rotate in an inboard down-down symmetric rotating pattern. In FIG. 5B, the propulsor rotors 58 of the aircraft propulsion systems 24A and 24B rotate in an inboard up-up symmetric rotating pattern. Such symmetric rotating patterns may facilitate a reduction in propulsion system noise, an increase in propulsion system performance, provision of symmetric control surface geometries, etc. By contrast, FIG. 6 illustrates propulsor rotors 600 of right and left side aircraft propulsion systems 602A and 602B rotating in an asymmetric rotating pattern.

Typically, to facilitate a symmetric rotating pattern in companion open rotor and/or inline gearbox engines, prior art companion engines may be configured with completely different engine cores. For example, a low speed rotating structure in one companion engine may be configured to rotate in the first direction whereas a low speed rotating structure in the other companion engine may be configured to rotate in the second direction. Such an arrangement, however, may lead to duplication of research and development efforts for the two different engine cores. Moreover, to maintain a supply of spare parts, two separate supplies of spare parts may be maintained, one for each engine core configuration. By contrast, the aircraft propulsion systems 24 of the present disclosure may be provided with different PT rotor configurations (e.g., mirror-image PT rotor configurations) to facilitate the symmetric rotating patterns described above. The first aircraft propulsion system 24A and the second aircraft propulsion system 24B may thereby share a common (e.g., the same, identical, etc.) engine core configuration and, thus, a common engine core part number.

Figure 7:
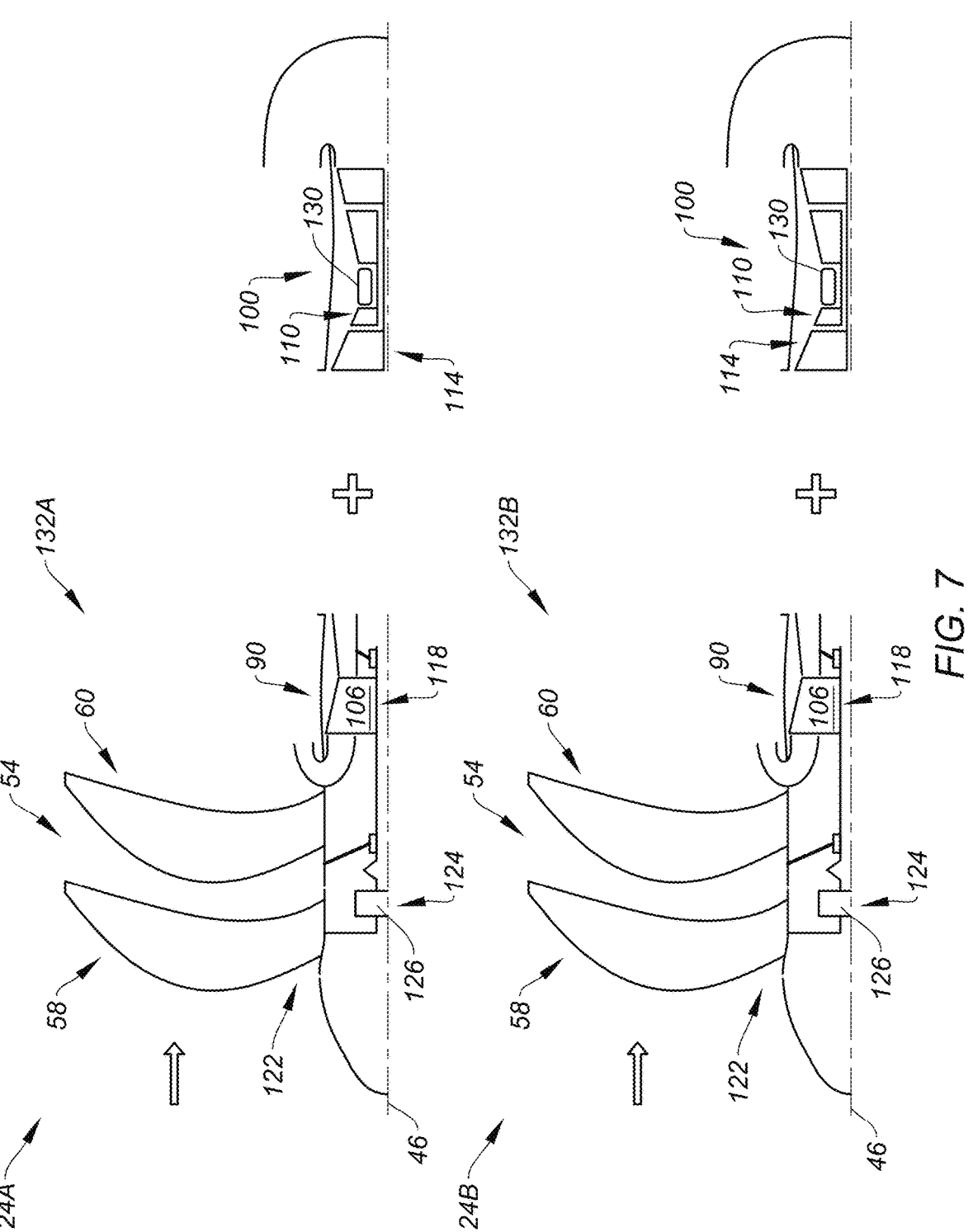
FIG. 7 is a partial schematic illustration depicting assembly of first and second aircraft propulsion systems.

In some embodiments, referring to FIG. 7, each of the aircraft propulsion systems 24A and 24B may be configured with a unique propulsor module 132A and 132B (generally referred to as "132"). This propulsor module 132 may include the respective propulsor rotor 58, the respective PT rotor 106 and the respective drivetrain 124 coupling those propulsion system rotors 58 and 106 together. The propulsor module 132 may (or may not) also include the respective guide vane structure 60. However, the aircraft propulsion systems 24A and 24B may include common engine cores 100 as described above or at least one or more common internal core components and/or structures; e.g., the rotating structure(s) 110 and/or 114, the combustor 130, etc. Such common elements may be identical and may share a single manufacturer/supplier part number. With such an arrangement, each aircraft propulsion system 24 may be assembled by mating and mounting its unique propulsor module 132 to the common engine core 100. Spare parts for the companion first and second aircraft propulsion systems 24A, 24B may thereby be significantly reduced because a single replacement engine core and/or set a parts may be used with either the first aircraft propulsion system 24A or the second aircraft propulsion system 24B. Of course, it is contemplated the propulsor modules 132 may also include one or more common components; e.g., the actuation systems(s) 72 and/or 84 of FIG. 4. Moreover, it is contemplated the PT section 90 may be omitted from the propulsor module 132 or included in a separate module when, for example, the engine core 100 is axially between the propulsion section 54 and the PT section 90, examples of which are described below in further detail.

Figure 11:
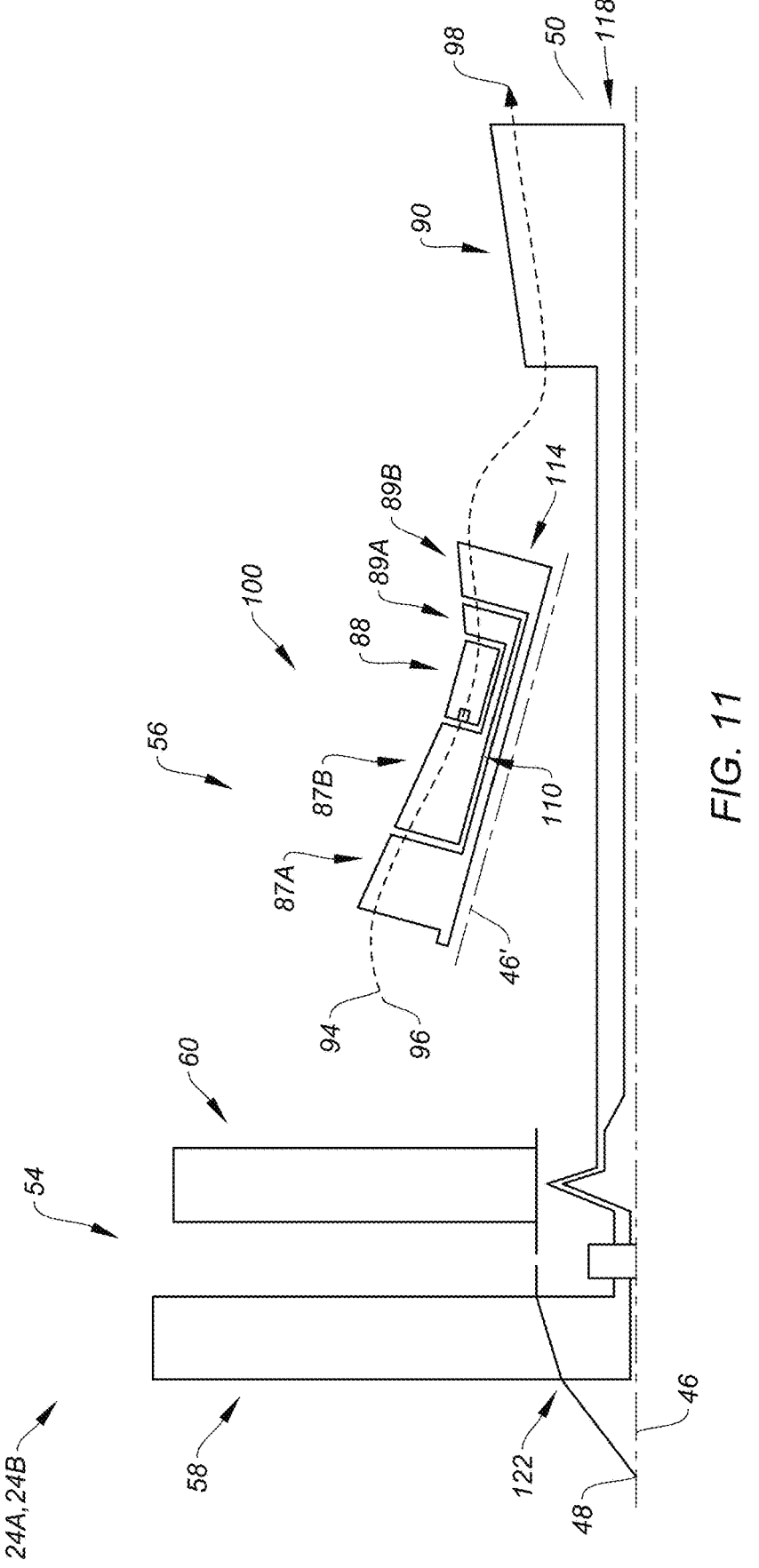

In some embodiments, referring to FIG. 3, each of the propulsion system rotating structures 110, 114, 118 and 122 may be rotatable about a common rotational axis 46; e.g., the propulsion system axis 46. The propulsion system rotating structures 110, 114, 118 and 122 may thereby be coaxial with one another. In other embodiments, referring to FIGS. 8 and 9, a rotational axis 46' of one or more of the core rotating structures 110 and/or 114 may be offset from a rotational axis (e.g., 46) of one or more of the other propulsion system rotating structures 118 and/or 122. Each core rotating structure 110, 114 and its rotational axis 46' of FIG. 8 (see also FIG. 11), for example, is angularly offset from each propulsion system rotating structure 118, 122 and its rotational axis (e.g., 46) by an included angle 134; e.g., a non-zero acute angle. In another example, each core rotating structure 110, 114 and its rotational axis 46' of FIG. 9 is laterally offset from each propulsion system rotating structure 118, 122 and its rotational axis (e.g., 46). Here, each core rotating structure 110, 114 and its rotational axis 46' may (or may not) be parallel with each propulsion system rotating structure 118, 122 and its rotational axis (e.g., 46).

Figure 8:
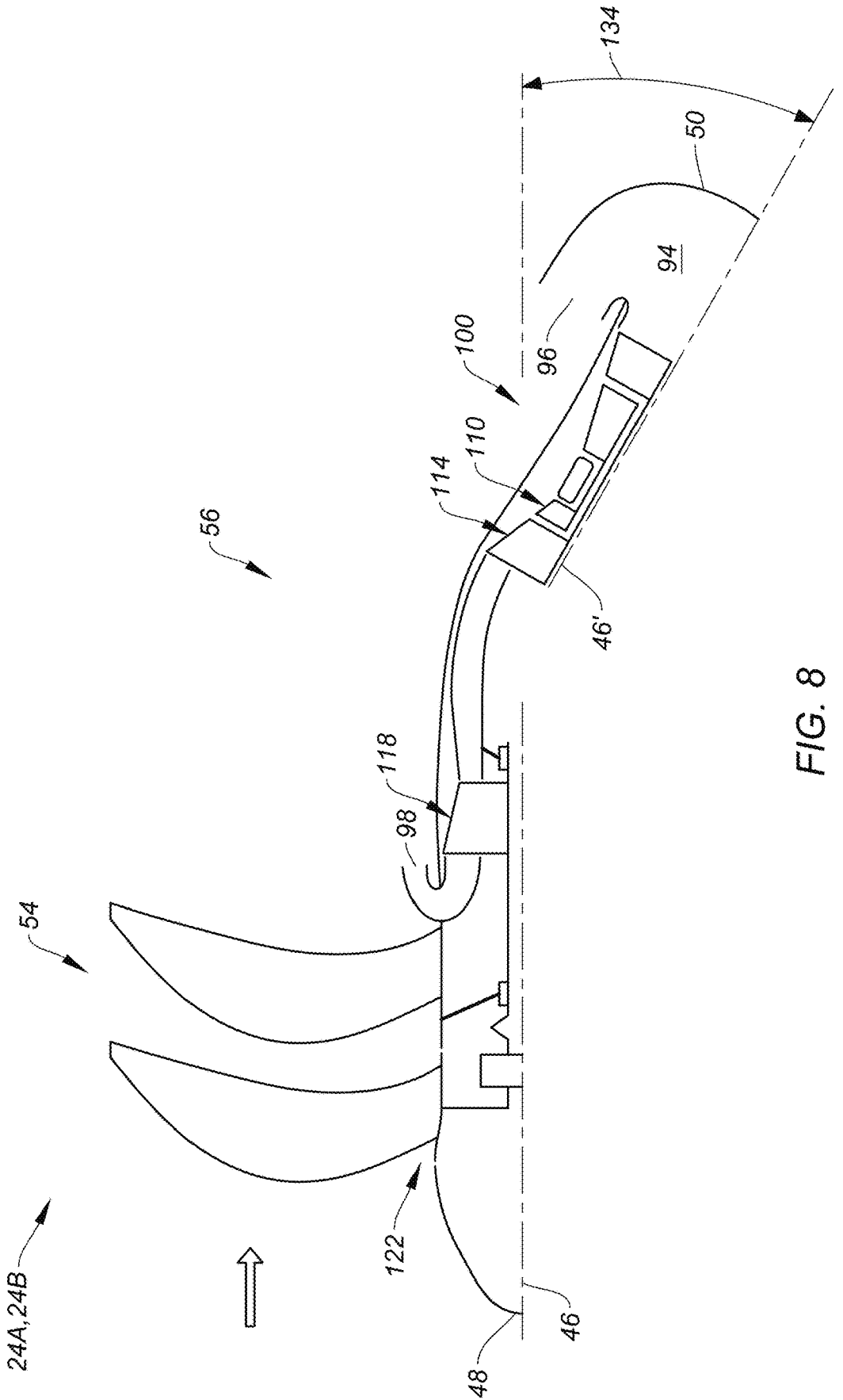
FIGS. 8-11 are partial schematic illustrations of a propulsion system with various other engine core arrangements.
Figure 9:
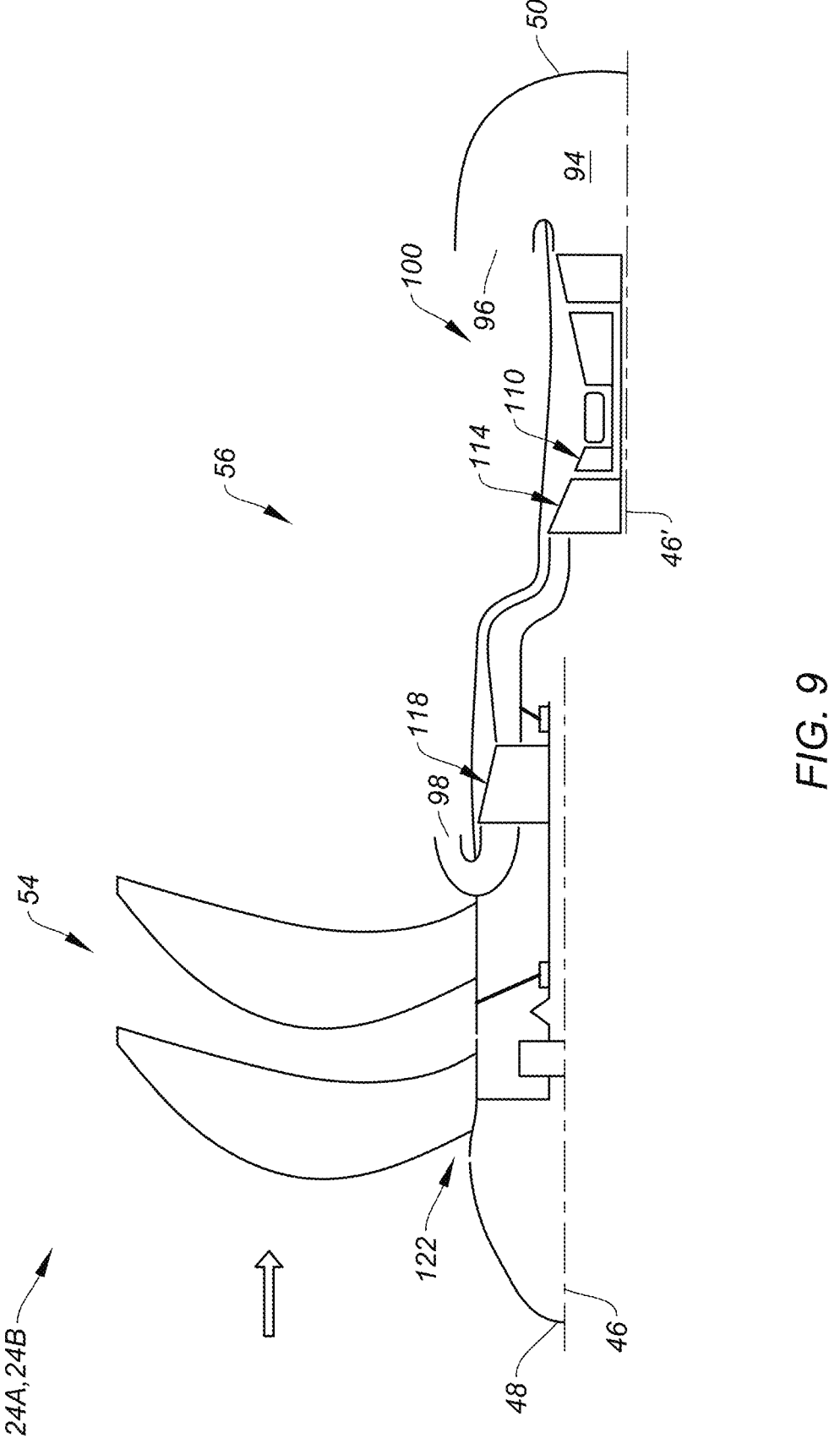
Figure 10:
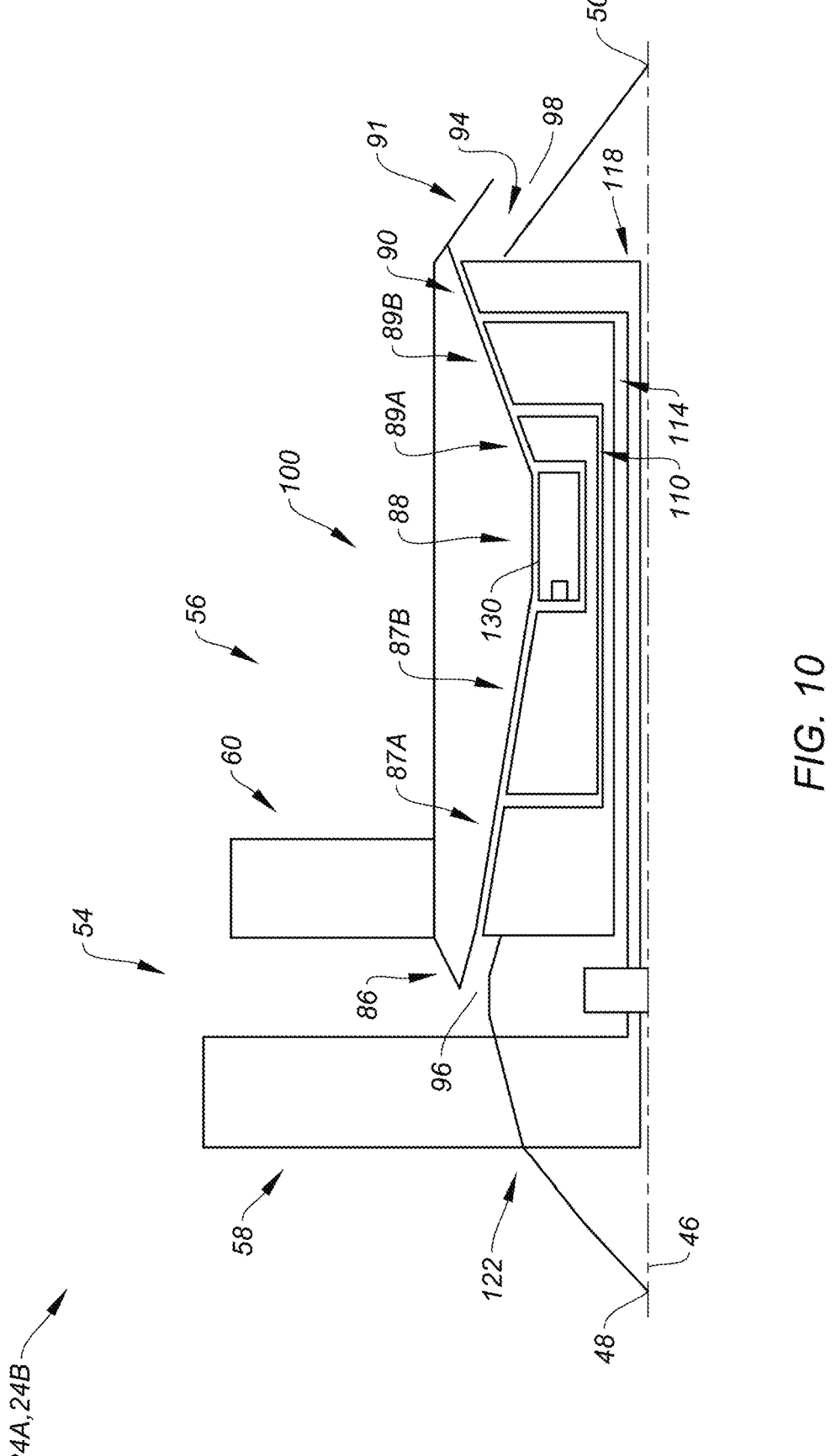

In some embodiments, referring to FIGS. 3, 8 and 9, the turbine engine 56 may have a reverse flow engine arrangement. With such an arrangement, the engine flowpath 94 is configured such that the core air and the combustion products generally flow in a forward, upstream direction towards the propulsion system forward end 48. The core air and the combustion products may thereby flow in an opposite direction as the ambient air propelled by the rotating propulsor rotor 58. In other embodiments, referring to FIGS. 10 and 11, the engine flowpath 94 may be configured such that the core air and the combustion products generally flow in an aft, downstream direction towards the propulsion system aft end 50. The core air and the combustion products may thereby flow in a common axial direction—the downstream, aft direction—as the ambient air propelled by the rotating propulsor rotor 58. With such an arrangement, the engine core 100 and its engine sections 87A-89B may be arranged axially along the propulsion system axis 46 between (a) the propulsion section 54 or at least its propulsor rotor 58 and (b) the PT section 90. Here too, the inlet section 86 is disposed axially forward of the exhaust section 91.

Referring to FIG. 3 for example, each propulsion section 54 is described above with a tractor configuration; e.g., where the propulsor rotor 58 is disposed at or otherwise near the propulsion system forward end 48. It is contemplated, however, the propulsion section 54 may alternatively be disposed at or otherwise near the propulsion system aft end 50 to provide a pusher fan configuration.

Each guide vane structure 60 is described above as a fixed (e.g., non-rotatable) guide vane structure. It is contemplated, however, the guide vane structure 60 may alternatively be selectively rotatable about the propulsion system axis 46. With such an arrangement, the respective aircraft propulsion system 24 may be configured as an open rotor propulsion system with a swirl recovery blade (SRB) open rotor architecture. More particularly, the respective aircraft propulsion system 24 may operate as: (A) a counter-rotating open rotor (CROR) propulsion system during a dual rotor mode of operation (e.g., when both the propulsor rotor 58 and the structure 60 are counter-rotating about the propulsion system axis 46); and (B) a single open rotor and swirl recovery vane (SRV) propulsion system during a single rotor mode of operation (e.g., when the propulsor rotor 58 is rotating and the structure 60 is rotationally fixed about the propulsion system axis 46). Note, when the guide vane structure 60 is configured to selectively rotate about the propulsion system axis 46, the moving guide vanes 74 operate as propulsor blades 66.

Each aircraft propulsion system 24 is described above as including the propulsor rotor 58 paired with the guide vane structure 60. The present disclosure, however, is not limited to such an exemplary propulsion system configuration. For example, it is contemplated each aircraft propulsion system 24 may be configured as a single rotor (SR) open rotor propulsion system without the guide vane structure 60. In another example, it is contemplated each aircraft propulsion system 24 may be configured as a counter-rotating open rotor (CROR) propulsion system where the guide vane structure 60 is replaced by another open propulsor rotor which may also be powered by the respective power turbine rotating structure 118 or otherwise.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:

a first propulsion system including a first open propulsor rotor rotatable around a first axis, a first core compressor section, a first core combustor section, a first core turbine section, a first power turbine section, a first flowpath, a first core turbine rotor, a first power turbine rotor, and a first open guide vane structure, the first flowpath extending through the first core compressor section, the first core combustor section, the first core turbine section and the first power turbine section from an inlet into the first flowpath to an exhaust from the first flowpath, the first core turbine rotor disposed in the first core turbine section and configured to rotate in a first rotational direction, the first power turbine rotor disposed in the first power turbine section and configured to rotate in the first rotational direction, and the first power turbine rotor operatively coupled to the first open propulsor rotor, and the first open guide vane structure axially next to and downstream of the first open propulsor rotor, wherein the first open guide vane structure is selectively rotationally fixed or rotatable about the first axis; and a second propulsion system including a second open propulsor rotor rotatable around a second axis, a second core compressor section, a second core combustor section, a second core turbine section, a second power turbine section, a second flowpath, a second core turbine rotor, a second power turbine rotor and a second open guide vane structure, the second flowpath extending through the second core compressor section, the second core combustor section, the second core turbine section and the second power turbine section from an inlet into the second flowpath to an exhaust from the second flowpath, the second core turbine rotor disposed in the second core turbine section and configured to rotate in the first rotational direction, the second power turbine rotor disposed in the second power turbine section and configured to rotate in a second rotational direction that is opposite the first rotational direction, and the second power turbine rotor operatively coupled to the second open propulsor rotor, and the second open guide vane structure axially next to and downstream of the second open propulsor rotor, wherein the second open guide vane structure is selectively rotationally fixed or rotatable about the second axis.

2. The aircraft system of claim 1, wherein the first open propulsor rotor is configured to rotate in an opposite rotational direction than the second open propulsor rotor.

3. The aircraft system of claim 1, wherein the first open propulsor rotor is configured to rotate in the first rotational direction; and the second open propulsor rotor is configured to rotate in the second rotational direction.

4. The aircraft system of claim 1, wherein the first open propulsor rotor is configured to rotate in the second rotational direction; and the second open propulsor rotor is configured to rotate in the first rotational direction.

5. The aircraft system of claim 1, wherein at least one of the first propulsion system further includes a first module and a first engine core, the first module includes the first open propulsor rotor and the first open guide vane structure, the first engine core includes the first core compressor section, the first core combustor section and the first core turbine section, and the first module is configured to be installed with or removed from the first engine core as a complete unit; or the second propulsion system further includes a second module and a second engine core, the second module includes the second open propulsor rotor and the second open guide vane structure, the second engine core includes the second core compressor section, the second core combustor section and the second core turbine section, and the second module is configured to be installed with or removed from the second engine core as a complete unit.

6. The aircraft system of claim 1, wherein at least one of the first propulsion system further includes a first module and a first engine core, the first module includes the first open propulsor rotor and the first power turbine section, the first engine core includes the first core compressor section, the first core combustor section and the first core turbine section, and the first module is configured to be installed with or removed from the first engine core as a complete unit; or the second propulsion system further includes a second module and a second engine core, the second module includes the second open propulsor rotor and the second power turbine section, the second engine core includes the second core compressor section, the second core combustor section and the second core turbine section, and the second module is configured to be installed with or removed from the second engine core as a complete unit.

7. The aircraft system of claim 1, wherein at least one of the first propulsion system further includes a first module and a first engine core, the first module comprises the first power turbine section, the first engine core includes the first core compressor section, the first core combustor section and the first core turbine section, and the first module is configured to be installed with or removed from the first engine core as a complete unit; or the second propulsion system further includes a second module and a second engine core, the second module comprises the second power turbine section, the second engine core includes the second core compressor section, the second core combustor section and the second core turbine section, and the second module is configured to be installed with or removed from the second engine core as a complete unit.

8. The aircraft system of claim 1, wherein at least one of the first core turbine rotor is a first intermediate pressure turbine rotor, the first propulsion system further includes a first high pressure turbine rotor also disposed in the first core turbine section, and the first intermediate pressure turbine rotor is disposed between the first high pressure turbine rotor and the first power turbine rotor along the first flowpath; or the second core turbine rotor is a second intermediate pressure turbine rotor, the second propulsion system further includes a second high pressure turbine rotor also disposed in the second core turbine section, and the second intermediate pressure turbine rotor is disposed between the second high pressure turbine rotor and the second power turbine rotor along the second flowpath.

9. The aircraft system of claim 1, wherein at least one of the first power turbine rotor is located axially between the first open propulsor rotor and the first core turbine rotor along the first axis; or the second power turbine rotor is located axially between the second open propulsor rotor and the second core turbine rotor along the second axis.

10. The aircraft system of claim 1, wherein at least one of the first open propulsor rotor is coaxial with the first power turbine rotor; or the second open propulsor rotor is coaxial with the second power turbine rotor.

11. The aircraft system of claim 1, wherein at least one of the first open propulsor rotor is coaxial with the first core turbine rotor; or the second open propulsor rotor is coaxial with the second core turbine rotor.

12. The aircraft system of claim 1, wherein at least one of the first core turbine rotor is rotatable about a first core axis that is angularly offset from the first axis; or the second core turbine rotor is rotatable about a second core axis that is angularly offset from the second axis.

13. The aircraft system of claim 1, wherein at least one of the first core turbine rotor is rotatable about a first core axis that is laterally offset from the first axis; or the second core turbine rotor is rotatable about a second core axis that is laterally offset from the second axis.

14. The aircraft system of claim 1, wherein at least one of the first propulsion system further includes a first geartrain operatively coupling the first power turbine rotor to the first open propulsor rotor; or the second propulsion system further includes a second geartrain operatively coupling the second power turbine rotor to the second open propulsor rotor.

15. The aircraft system of claim 1, wherein at least one of the first propulsion system extends axially along a first centerline axis between a forward end of the first propulsion system and an aft end of the first propulsion system, and the first open propulsor rotor is disposed axially between the forward end of the first propulsion system and the first core combustor section; or the second propulsion system extends axially along a second centerline axis between a forward end of the second propulsion system and an aft end of the second propulsion system, and the second open propulsor rotor is disposed axially between the forward end of the second propulsion system and the second core combustor section.

16. An aircraft system, comprising:

a first open propulsor rotor;

a first open guide vane structure next to the first open propulsor rotor; and a first turbine engine including a first core compressor section, a first core combustor section, a first core turbine section, a first power turbine section, a first flowpath, a first core turbine rotor and a first power turbine rotor, the first flowpath extending through the first core compressor section, the first core combustor section, the first core turbine section and the first power turbine section from an inlet into the first flowpath to an exhaust from the first flowpath, the first core turbine rotor disposed in the first core turbine section and configured to rotate in a first rotational direction, the first power turbine rotor disposed in the first power turbine section and configured to rotate in the first rotational direction, and the first power turbine rotor further configured to drive rotation of the first open propulsor rotor in a first propulsor rotational direction about a first axis;

wherein the first power turbine rotor is disposed axially between the first open propulsor rotor and the first core turbine rotor along the first axis, and the first open guide vane structure is selectively rotationally fixed or rotatable about the first axis.

17. The aircraft system of claim 16, further comprising:

a second open propulsor rotor;

a second open guide vane structure next to the second open propulsor rotor; and a second turbine engine including a second core compressor section, a second core combustor section, a second core turbine section, a second power turbine section, a second flowpath, a second core turbine rotor and a second power turbine rotor, the second flowpath extending through the second core compressor section, the second core combustor section, the second core turbine section and the second power turbine section from an inlet into the second flowpath to an exhaust from the second flowpath, the second core turbine rotor disposed in the second core turbine section and configured to rotate in the first rotational direction, the second power turbine rotor disposed in the second power turbine section and configured to rotate in a second rotational direction opposite the first rotational direction, and the second power turbine rotor further configured to drive rotation of the second open propulsor rotor in a second propulsor rotational direction about a second axis that is opposite the first propulsor rotational direction;

wherein the second power turbine rotor is disposed axially between the second open propulsor rotor and the second core turbine rotor along the second axis, and the second open guide vane structure is selectively rotationally fixed or rotatable about the second axis.

18. The aircraft system of claim 17, wherein the first core turbine rotor is a first intermediate pressure turbine rotor;

the first turbine engine further includes a first high pressure turbine rotor also disposed in the first core turbine section; and the first intermediate pressure turbine rotor is disposed between the first high pressure turbine rotor and the first power turbine rotor along the first flowpath.

19. An aircraft system, comprising:

a first propulsion system including a first open propulsor rotor, a first core compressor section, a first core combustor section, a first core turbine section, a first power turbine section, a first flowpath, a first core turbine rotor and a first power turbine rotor, the first flowpath extending through the first core compressor section, the first core combustor section, the first core turbine section and the first power turbine section from an inlet into the first flowpath to an exhaust from the first flowpath, the first core turbine rotor disposed in the first core turbine section and configured to rotate in a first rotational direction, the first power turbine rotor disposed in the first power turbine section and configured to rotate in the first rotational direction, and the first power turbine rotor operatively coupled to the first open propulsor rotor; and a second propulsion system including a second open propulsor rotor, a second core compressor section, a second core combustor section, a second core turbine section, a second power turbine section, a second flowpath, a second core turbine rotor and a second power turbine rotor, the second flowpath extending through the second core compressor section, the second core combustor section, the second core turbine section and the second power turbine section from an inlet into the second flowpath to an exhaust from the second flowpath, the second core turbine rotor disposed in the second core turbine section and configured to rotate in the first rotational direction, the second power turbine rotor disposed in the second power turbine section and configured to rotate in a second rotational direction that is opposite the first rotational direction, and the second power turbine rotor operatively coupled to the second open propulsor rotor;

wherein at least one of the first open propulsor rotor is rotatable about a first axis, and the first core turbine rotor is located axially between the first open propulsor rotor and the first power turbine rotor along the first axis; or the second open propulsor rotor is rotatable about a second axis, and the second core turbine rotor is located axially between the second open propulsor rotor and the second power turbine rotor along the second axis.

* * * * *